Patented Aug. 28, 1951

2,566,199

UNITED STATES PATENT OFFICE 2,566,199

THERMOPLASTIC CASTING COMPOSITION AND METHOD OF EMPLOYING SAME

Gordon D. Hiatt and Helen N. Jarvis, Rochester, N. Y., assignors to Eastman Kodak Company, Rochester, N. Y., a corporation of New Jersey No Drawing. Application February 16, 1948, Serial No. 8,746

9 Claims. (Cl. 18—58)

This invention relates to a thermoplastic composition which is useful for preparing molded products in which the composition is poured into a casting mold and permitted to set.

Heretofore molded articles have been prepared by either compressing the molten material in a compression-type mold or injecting the plastic material into a mold by means of a plunger and nozzle. In those cases, due to the use of pressure, the products have been formed with little difficulty and no particular problems have been involved in those operations.

One object of our invention is to provide a method for the preparing of molded products in which a simple hand mold may be employed. Another object of our invention is to provide a composition which is eminently suitable for use in such a molding operation. A still further object of our invention is to provide a method for preparing molded products having good color, and being free of both brittleness and rubberiness. A still further object of our invention is to provide a molding method in which expensive and heavy equipment is unnecessary such as must be employed in preparing molded objects from the usual thermoplastic compositions. Other objects of our invention will appear herein.

The process of our invention is of the type in which the molten thermoplastic composition is poured into a simple casting mold and after remaining for a short time the liquid portion of the thermoplastic composition is poured out thus leaving a molded product which is hollow. Our composition is characterized by shortness of setting so that when poured into the mold the outside portion sets having good thickness while the inner portion thereof may be readily poured so as to be removed from the product. We have found that compositions consisting of high propionyl or high butyryl cellulose esters, opal wax (hydrogenated castor oil) and a mixture of polymeric and monomeric materials, which mixture is solvent for the cellulose ester at 100–180° C., gives a product having good heat stability and good hardness, which is substantially odorless and which retains its color well. Also the resulting product obtained using this composition exhibits uniformity upon using in cast molding as employed in our process.

The composition of our invention consists of 35–60 parts of a high propionyl or high butyryl cellulose ester. The ester employed should have an intrinsic viscosity of .5–1.8 in acetone. If a butyric acid ester of cellulose is employed, the butyryl content should be at least 35% and preferably above 45%. If a propionyl ester of cellulose is employed, the propionyl content should be at least 40% and preferably greater than 45%. Cellulose acetate propionates or acetate butyrates are especially useful for use in the compositions in accordance with our invention. The cast molding composition of our invention should also contain 20–40 parts of opal wax and 10–30 parts of a homogenized polymer-monomer mixture having a boiling point above 250° C. which mixture is a solvent for the cellulose ester used at 100–180° C. The polymer-monomer mixture should consist of 80–20% of the polymer and 20–80% of the monomer. The monomers which are useful in preparing the polymer-monomer mixture are esters which have been employed heretofore as plasticizers for cellulose esters. The monomers which are useful in our invention are any of the chemical plasticizers having a boiling point above 250° C., and which are solvent of high butyryl cellulose esters at 100–180° C. Some of these plasticizers which are useful in our composition are the alkyl phthalates such as dimethyl, diethyl, dibutyl or dioctyl phthalate or the alkoxy alkyl phthalates such as methoxy ethyl, ethoxy ethyl, butoxy ethyl phthalate, and the like; the adipates such as butyl, octyl, amyl, or di-2-ethyl hexyl adipate, butoxy ethyl or ethoxy butyl adipate, or similar compounds; the alkyl sebacates in which the alkyl group is butyl or higher such as dibutyl sebacate, hexyl sebacate, or di-2-ethyl hexyl sebacate; the phosphates such as phenyl, cresyl, octyl, monoortho-xenyl, diphenyl or trichloroethyl phosphate, or phosphates having similar properties; castor oil, the alkoxy alkyl stearates such as methoxy ethyl stearate or butoxy ethyl stearate, or the palmitates with similar properties; alkyl abietate, hydrogenated alkyl abietate, butoxy ethyl laurate or any of the other chemical plasticizers having the properties specified. The above compounds are representative of chemical plasticizers boiling above 250° C., which are solvents of high butyryl cellulose esters at 100–180° C. By the term "chemical plasticizers" is meant non-polymeric (monomeric) plasticizers, this being the meaning of this term as commonly used in the art.

The polymers which are suitable for use in our composition are any of the low molecular weight, heat stable polymers which are compatible with the plasticizers of the type described, and are also compatible with the other ingredients of our composition. The molecular weight of the polymers useful in our composition may be from 300 up to 5000 or even 6000 although those polymers having a molecular weight in the range of 300–1000 are particularly suitable for compositions of the type described herein. Some of the polymers which are particularly useful in our compositions are the chlorinated polyphenyls, polystyrene, methylated polystyrene, polyvinyl acetate, glycol sebacate resins, polybutyl methacrylate, butyl methacrylate, and the cumarone-indene resins. These polymers are representative of the polymers which are compatible with chemical plasticizers.

Some of the cellulose esters which are useful in compositions in accordance with our invention are cellulose acetate butyrates having a butyryl content of approximately 48% and an acetyl content of approximately 7% (and an intrinsic viscosity of from .9–1.5), cellulose acetate propionates having a propionyl content of approximately 46% and an acetyl content of approximately 2%, or cellulose butyrates having a butyryl content of 52% and an acetyl content of from 0–2%, which esters have an intrinsic viscosity of .9 to 1.5.

We have found that the presence of at least 20% of the opal wax in the composition is necessary to obtain a substantial setting of the composition upon mold casting. For instance, a 50–50 mixture of cellulose acetate butyrate and polymer-monomer mixture but without opal wax shows no marked setting in the range of 100–160° C. With a mixture consisting of 50 parts of the cellulose acetate butyrate and 40 parts of the polymer-monomer mixture and 10 parts of opal wax, the viscosity of the mass changes from 7200 centipoises at 120° C. to 21,000 centipoises at 100° C. If, however, 30% of opal wax is incorporated the change in viscosity is from 4000 centipoises at 140° to infinity at 115° C. Thus, in mold casting operations using compositions in accordance with our invention there need be but little difference in temperature between the outside layer in the mold adjacent the mold surface and the inner portion thereof for the latter to be readily flowable, whereas the outer portion will have set so as to resist pouring or any other mechanical movement which might be involved in removing the liquid inner portion thereof.

Some of the compositions which are useful are the following:

| Cellulose Acetate Butyrate or Acetate Propionate | Opal Wax | Polymer | Plasticizer |
| --- | --- | --- | --- |
| 50 | 25 | 15 | 10 |
| 70 | 05 | 39 | 26 |
| 50 | 35 | 10 | 5 |
| 40 | 20 | 13 | 27 |
| 60 | 30 | 10 | 25 |
| 48 | 32 | 8 | 12 |
| 40 | 27 | 20 | 13 |
| 60 | 40 | 26 | 14 |

In forming cast moldings in accordance with our invention ordinary hand molds may be employed. For short runs on objects not having under-cuts plaster molds may be used, while for longer runs metal molds are preferably employed. These metal molds may be of soft metal such as lead or type metal. For articles with under-cuts, rubber molds are desirable. The molds should be made in two or more parts with a large gate. The molding composition may be either as described, or a pigment or dyeing material may be added thereto. For instance, if a white pigment is desired titanium dioxide is suitable. If color is desired in the final product, either a colored pigment or a heat-stable dye such as ordinarily employed with cellulose esters may be used, the dye selected being governed by the color changes desired. The mold casting operation is carried out by melting together the plasticizer, wax and polymer in a jacketed mixing kettle, heating until the mass is melted and well dissolved. The high butyryl or high propionyl cellulose ester is then added slowly with continuous agitation and the mass is heated until complete solution is obtained at approximately 350° F. After the composition has become homogeneous it is allowed to stand sufficiently long to permit bubbles to rise to the surface. The melt is then poured into a mold and after 10 to 30 seconds is poured out again so that a hollow article is obtained. Rapid setting in the mold may be induced by filling the molded article with water. Ordinarily it is desirable to carry out the molding operation so that the wall thickness is from ⅛ to ¼ inch although this may be varied as desired. After the molded article has set the mold may be taken apart and the article removed therefrom. For added gloss and mar resistance the casting may be lacquered such as with a cellulose acetate butyrate or nitrocellulose lacquer.

After the molded article is removed it may be finished such as by cutting or grinding off any flashings or other protruding elements. The following examples illustrate our invention.

*Example 1*

A melt was prepared having the following composition: 50 parts of cellulose acetate butyrate having a butyryl content of 46.6% and an acetyl content of 7.1%, and an intrinsic viscosity in acetone of .96, 25 parts of opal wax (hydrogenated castor oil), 15 parts of methylated polystyrene, 10 parts of dioctyl phthalate. The mix was heated to 170° C. to give a smooth fluid melt. This melt was used to fill a split aluminum mold. After a short time the mold was inverted to drain out the material which was still liquid. The mold was then cooled with running water, was opened and the hollow cast object was removed therefrom. The resulting cast object had good impact strength, rigidity, and hardness.

*Example 2*

A melt was prepared having the following composition: 70 parts of cellulose acetate butyrate having a butyryl content of 47.7%, an acetyl content of 6.4 and an intrinsic viscosity of 1.49 measured in acetone, 65 parts of hydrogenated castor oil (opal wax) 30 parts of chlorinated diphenyl having a chlorine content of about 60% and 26 parts of methyl Cellosolve stearate. To the molten composition was added 2% titanium dioxide which had been ground in a small amount of plasticizer. The fluid melt was poured into a split mold and in a very short time the mold was inverted and the liquid remaining therein was poured out. The operation was completed as described in the preceding example. The portion of the composition which had set because of the cooling effect of the mold gave a wall thickness of 0.12 inch.

The setting characteristics of our compositions appear to be due primarily to the use of opal wax therein. For instance, in compositions prepared in which opal wax constitutes 40% thereof it was found that whereas the viscosity of the composition at 130° C. was approximately 10,000 centipoises, this composition had a viscosity of over 35,000 centipoises at 122° C. and at 120° C. no flow occurred. With compositions having 30% opal wax the viscosity was but a little more than 10,000 centipoises at 125° C. whereas at 118° C. the viscosity was 40,000, and flow had ceased at 116° C. With compositions having 20% opal wax therein the viscosity was 15,000 centipoises whereas at 102° C. the viscosity had risen to more than 50,000 centipoises and flow had ceased at 100° C. The compositions in accordance with our invention are characterized by sharp setting points thus making possible the preparation of hollow molded objects with great facility which is not possible with compositions in which some or all of the proportions or ingredients as described herein are dispensed with.

What we claim and desire to secure by Letters Patent of the United States is:

1. A thermoplastic mold casting composition consisting essentially of 35–60 parts of a cellulose ester having an intrinsic viscosity of .5–1.8, selected from the group consisting of the butyric acid esters of cellulose having a butyryl content of at least 35% and the propionic esters of cellulose having a propionyl content of at least 40%, 20–40 parts of hydrogenated castor oil and 10–30 parts of a homogeneous mixture of a material selected from the group consisting of the polymers and chlorinated diphenyls having a molecular weight within the range of 300–6000 and an ester plasticizer having a boiling point above 250° C., which ester is a solvent for high butyryl cellulose ester at 100–180° C., which mixture is a solvent for the cellulose ester at 100–180° C. and is composed of 80–20% of polymer and 20–80% of the plasticizer.

2. A thermoplastic mold casting composition consisting essentially of 35–60 parts of a butyric acid ester of cellulose having a butyryl content of at least 35% and an intrinsic viscosity within the range of .5–1.8, 20–40 parts of hydrogenated castor oil and 10–30 parts of a homogeneous mixture of a material selected from the group consisting of the polymers and chlorinated diphenyls having a molecular weight within the range of 300–6000 and an ester plasticizer having a boiling point above 250° C., which ester plasticizer is a solvent for high butyryl cellulose ester at 100–180° C., which mixture is a solvent for the cellulose ester at 100–180° C., and is composed of 80–20% of the polymer and 20–80% of the plasticizer.

3. A thermoplastic mold casting composition consisting essentially of 35–60 parts of a propionic acid ester of cellulose having a propionyl content of at least 40% and an intrinsic viscosity within the range of .5–1.8, 20–40 parts of hydrogenated castor oil and 10–30 parts of a homogeneous mixture of a material selected from the group consisting of the polymers and chlorinated diphenyls having a molecular weight within the range of 300–6000 and an ester plasticizer having a boiling point above 250° C., which ester plasticizer is a solvent for high butyryl cellulose ester at 100–180° C., which mixture is a solvent for the cellulose ester at 100–180° C., and is composed of 80–20% of the polymer and 20–80% of the plasticizer.

4. A thermoplastic mold casting composition consisting essentially of 35–60 parts of a cellulose acetate butyrate having a butyryl content of at least 35% and an intrinsic viscosity within the range of .5–1.8, 20–40 parts of hydrogenated castor oil and 10–30 parts of a homogeneous mixture of a material selected from the group consisting of the polymers and chlorinated diphenyls having a molecular weight within the range of 300–6000 and an ester plasticizer having a boiling point above 250° C., which ester plasticizer is a solvent for high butyryl cellulose ester at 100–180° C., which mixture is a solvent for the cellulose ester at 100–180° C., and is composed of 80–20% of the polymer and 20–80% of the plasticizer.

5. A thermoplastic mold casting composition consisting essentially of 35–60 parts of a cellulose butyrate having a butyryl content of 48%, an acetyl content of 7%, and an intrinsic viscosity of .9–1.5, 20–40 parts of hydrogenated castor oil and 10–30 parts of a homogeneous mixture of a material selected from the group consisting of the polymers and chlorinated diphenyls having a molecular weight within the range of 300–6000 and an ester plasticizer having a boiling point above 250° C., which ester is a solvent of high butyryl ester at 100–180° C., which mixture is a solvent for the cellulose ester at 100–180° C., and is composed of 80–20% of polymer and 20–80% of the plasticizer.

6. A thermoplastic mold casting composition consisting essentially of 35 parts of cellulose acetate butyrate having a butyryl content of 48%, an acetyl content of 7%, and an intrinsic viscosity of .9–1.5, 32 parts of hydrogenated castor oil, 15 parts of chlorinated diphenyl having a molecular weight within the range of 300–6,000 and 15 parts of methyl Cellosolve stearate.

7. A thermoplastic mold casting composition consisting essentially of 50 parts of cellulose acetate butyrate having a butyryl content of 48% and an acetyl content of 7%, and an intrinsic viscosity of .9–1.5, 25 parts of hydrogenated castor oil, 15 parts of chlorinated diphenyl, having a molecular weight within the range of 300–6,000 and 10 parts of dibutyl sebacate.

8. A method of preparing molded articles which comprises pouring into a mold in molten condition a composition essentially consisting of 35–60 parts of cellulose acetate butyrate having a butyryl content of at least 35%, and an intrinsic viscosity of .5–1.8, 20–40 parts of hydrogenated castor oil, and 10–30 parts of a homogeneous mixture of a material selected from the group consisting of the polymers and chlorinated diphenyls having a molecular weight within the range of 300–6000 and an ester plasticizer having a boiling point above 250° C., which ester is a solvent of high butyryl ester at 100–180° C., which mixture is a solvent for the cellulose acetate butyrate at 100–180° C., letting the mold stand for a sufficient time that a shell of the material forms and then pouring out of the mold any of the composition which remains liquid and subsequently removing the molded object from the mold.

9. A method of preparing molded articles which comprises pouring into a mold in molten condition a composition essentially consisting of 35–60 parts of cellulose acetate butyrate having a butyryl content of at least 48%, an acetyl content of 7%, and an intrinsic viscosity of .9–1.5, 20–40 parts of hydrogenated castor oil, and 10–30 parts of a homogeneous mixture of a material selected from the group consisting of the polymers and chlorinated diphenyls having a molecular weight within the range of 300–6000 and an ester plasticizer having a boiling point above 250° C., which ester is a solvent of high butyryl ester at 100–180° C., which mixture is a solvent for the cellulose acetate butyrate at 100–180° C., letting the mold stand for a sufficient time that a shell of the material forms and then pouring out of the mold any of the composition which remains liquid and subsequently removing the molded object from the mold.

GORDON D. HIATT.
HELEN N. JARVIS.

REFERENCES CITED

The following references are of record in the file of this patent:

UNITED STATES PATENTS

| Number | Name | Date |
|---|---|---|
| 1,506,061 | Henker | Aug. 26, 1924 |
| 2,064,292 | Charch | Dec. 15, 1936 |
| 2,409,986 | Salo | Oct. 22, 1946 |
| 2,415,788 | Champer | Feb. 11, 1947 |